(12) United States Patent
Ji et al.

(10) Patent No.: US 8,447,120 B2
(45) Date of Patent: May 21, 2013

(54) INCREMENTAL FEATURE INDEXING FOR SCALABLE LOCATION RECOGNITION

(75) Inventors: Rongrong Ji, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 12/245,710

(22) Filed: Oct. 4, 2008

(65) Prior Publication Data
US 2010/0088342 A1 Apr. 8, 2010

(51) Int. Cl.
G06K 9/68 (2006.01)

(52) U.S. Cl.
USPC ............ 382/226; 707/623; 707/702; 707/797

(58) Field of Classification Search
None
See application file for complete search history.

(56) References Cited

U.S. PATENT DOCUMENTS

| | | | | |
|---|---|---|---|---|
| 5,867,799 | A * | 2/1999 | Lang et al. ............................. | 1/1 |
| 6,084,595 | A | 7/2000 | Bach et al. | |
| 6,275,801 | B1 * | 8/2001 | Novak et al. ................... | 704/252 |
| 6,307,548 | B1 * | 10/2001 | Flinchem et al. ............. | 715/811 |
| 6,459,388 | B1 | 10/2002 | Baron | |
| 6,597,818 | B2 | 7/2003 | Kumar et al. | |
| 6,646,573 | B1 * | 11/2003 | Kushler et al. ................... | 341/28 |
| 6,775,664 | B2 * | 8/2004 | Lang et al. ............................. | 1/1 |
| 7,043,468 | B2 * | 5/2006 | Forman et al. ................... | 706/46 |
| 7,246,745 | B2 | 7/2007 | Hudnut et al. | |
| 7,627,474 | B2 * | 12/2009 | Kim et al. ...................... | 704/254 |
| 7,711,747 | B2 * | 5/2010 | Renders et al. ............... | 707/771 |
| 7,870,548 | B2 * | 1/2011 | Chu Chen et al. ............ | 717/168 |
| 7,903,883 | B2 * | 3/2011 | Zitnick et al. .................. | 382/225 |
| 7,949,186 | B2 * | 5/2011 | Grauman et al. ............. | 382/170 |
| 8,015,129 | B2 * | 9/2011 | Thiesson et al. ................. | 706/14 |
| 8,165,878 | B2 * | 4/2012 | Roberge et al. ............... | 704/243 |
| 2004/0181544 | A1 * | 9/2004 | Anderson ...................... | 707/102 |
| 2005/0063563 | A1 | 3/2005 | Soliman | |
| 2005/0162523 | A1 | 7/2005 | Darrell et al. | |
| 2005/0234973 | A1 * | 10/2005 | Zeng et al. ................. | 707/103 R |
| 2006/0106832 | A1 * | 5/2006 | Ben-Dyke et al. ............. | 707/100 |
| 2007/0038451 | A1 * | 2/2007 | Cogne et al. ................... | 704/256 |
| 2007/0047782 | A1 | 3/2007 | Hull et al. | |

(Continued)

OTHER PUBLICATIONS

Ji R., Xie X., Yao H., Wu Y., and Ma W., "Vocabulary tree incremental indexing for scalable location recognition", in Proc. ICME 2008, pp. 869-872, Jun. 2008.*

(Continued)

*Primary Examiner* — Vu Le
*Assistant Examiner* — Xuemei Chen
(74) *Attorney, Agent, or Firm* — Westman, Champlin & Kelly, P.A.

(57) ABSTRACT

Described is a technology in which an image retrieval system is updated incrementally as new image data becomes available. Updating is incrementally performed and only triggered when the new image data is large enough or diverse enough relative to the image data currently in use for image retrieval. Incremental updating updates the leaf nodes of a vocabulary tree based upon the new image data. Each leaf node's feature frequency is evaluated against upper and/or lower threshold values, to modify the nodes of the tree based on the feature frequency. Upon completion of the incremental updating, a server that performed the incremental updating is switched to an active state with respect to handling client queries for image retrieval, and another server that was actively handling client queries is switched to an inactive state, awaiting a subsequent incremental updating before switching back to active state.

16 Claims, 3 Drawing Sheets

U.S. PATENT DOCUMENTS

| | | | |
|---|---|---|---|
| 2007/0195167 A1* | 8/2007 | Ishiyama | 348/207.1 |
| 2007/0214172 A1 | 9/2007 | Nister et al. | |
| 2007/0217676 A1 | 9/2007 | Grauman et al. | |
| 2007/0294333 A1* | 12/2007 | Yang et al. | 709/203 |
| 2008/0205770 A1* | 8/2008 | Jia et al. | 382/217 |
| 2008/0301133 A1* | 12/2008 | Brown et al. | 707/6 |
| 2009/0024504 A1* | 1/2009 | Lerman et al. | 705/35 |
| 2009/0083332 A1* | 3/2009 | Datta et al. | 707/104.1 |
| 2009/0240500 A1* | 9/2009 | Tachimori et al. | 704/257 |
| 2009/0281981 A1* | 11/2009 | Chen et al. | 706/56 |
| 2009/0304582 A1* | 12/2009 | Rousso et al. | 424/1.61 |
| 2010/0049711 A1* | 2/2010 | Singh et al. | 707/6 |
| 2010/0195914 A1* | 8/2010 | Isard et al. | 382/201 |
| 2010/0254614 A1* | 10/2010 | Baker et al. | 382/218 |
| 2010/0257202 A1* | 10/2010 | Szummer et al. | 707/771 |
| 2012/0218424 A1* | 8/2012 | Gotoh et al. | 348/207.1 |

OTHER PUBLICATIONS

Schindler, G., "City-Scale Location Recognition," IEEE CVPR 2007, Jun. 2007.*

Bolle et al., "A Complete and Scalable Architecture for 3D Model-Based Vision", vol. 1, Digital Object Identifier, IEEE, 1990, pp. 212-219.

Vasconcelos, et al., "Scalable Discriminant Feature Selection for Image Retrieval and Recognition", IEEE Conf. on Computer Vision and Pattern Recognition, Washington DC, 2004, pp. 1-9.

Kosecka, et al., "Location Recognition and Global Localization Based on Scale-Invariant Keypoints", Wokshop on Statistical Learning in Computer Vision, European Conference on Computer Vision 2004, 10 Pages.

Yeh, et al., "Adaptive Vocabulary Forests for Dynamic Indexing and Category Learning", IEEE 11th International Conference, 2007, pp. 2-9.

Schindler, et al., "City-Scale Location Recognition", IEEE Conference on Computer Vision and Pattern Recognition, 2007, 7 Pages.

Robertson, et al., "An Image-Based System for Urban Navigation", British Machine Vision Conference, 2004, 10 Pages.

Zhang, et al., "Image Based Localization in Urban Environments", Proceedings of the Third International Symposium on 3D Data Processing, Visualization, and Transmission (3DPVT'06), 2006, pp. 33-40.

Mikolajczyk, et al., "Local Features for Object Class Recognition", Computer Vision, Tenth IEEE International Conference on ICCV 2005, 8 Pages.

Nister, et al., "Scalable Recognition with a Vocabulary Tree", IEEE Conference on Computer Vision and Pattern Recognition (CVPR), vol. 2, Jun. 2006, pp. 2161-2168.

Jia, et al., "Photo-to-Search: Using Camera Phones to Inquire of the Surrounding World", Proceedings of the 7th International Conference on Mobile Data Management (MDM'06), IEEE 2006, 3 Pages.

Kennedy, et al., "How Flickr helps us Make Sense of the World: Context and Content in Community-Contributed Media Collections", ACM, Sep. 23-28, 2007, 10 Pages.

Cadez, et al., "Model Based Population Tracking and Automatic Detection of Distribution Changes", in Proceedings of the NIPS, 2001, 8 Pages.

Campbell, et al., "A Linear Programming Approach to Novelty Detection", 2000, 7 Pages.

* cited by examiner

INCREMENTAL FEATURE INDEXING FOR SCALABLE LOCATION RECOGNITION

BACKGROUND

As mobile devices grow in popularity, patch-based image retrieval allows a user to photograph current surroundings via a camera-embedded mobile telephone or other device, transmit the photograph to a server as a query, and receive a corresponding GPS location and/or other location information. Additional location-related information may include shopping information, restaurant reviews and so forth, and may be returned to the user as part of the query results.

To determine the location corresponding to a photograph, images are offline-indexed for use by the server, using patch-based scene recognition model. However, to ensure sufficient coverage of a large area such as a city, enormous amounts of data need to be used. This means that the scene recognition model has to be effectively constructed and maintained in large-scale scenario.

In this technology, textual descriptors of scenes are quantized by hierarchical k-means clustering to generate a vocabulary tree, which produces "visual words" (quantized clusters with SIFT features) to represent each image as a Bag-of-Word (BoW) vector. In retrieval, the similarity of images is evaluated by the cosine distance between their BoW vectors. While this system works to a reasonable extent, the scene dataset requires a substantial amount of updating and extending, which is computationally expensive given the enormous amounts of data being maintained and accessed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an image retrieval system is updated incrementally as new image data becomes available, with updating triggered in a controlled manner based upon characteristics of the new image data. When new image data is received, the image data is evaluated to determine whether it meets a triggering criterion. If so a vocabulary tree model structure based upon the new image data is updated.

In one aspect, one triggering criterion corresponds to and amount (how much volume) of new image data is available. In one aspect, one triggering criterion corresponds to how diverse the new image data is with respect to other image data currently being used for image retrieval.

In one aspect, incremental updating updates the leaf nodes of a vocabulary tree based upon the new image data. Each leaf node's feature frequency is evaluated against upper and/or lower threshold values, to split a leaf node when the feature frequency exceeds an upper threshold value, delete a leaf node when the feature frequency is below a lower threshold value and the leaf node has at least one sibling leaf node, and withdraw a parent node to a leaf node when the feature frequency is below a lower threshold value and the leaf node has no sibling leaf node or nodes.

In one aspect, upon completion of the incremental updating, the server that performed the incremental updating is switched to an active state with respect to handling client queries for image retrieval, and another server that was actively handling client queries is switched to an inactive state, awaiting a subsequent incremental updating before switching back to active Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards enabling a scene recognition system to be maintained in a scalable and incremental way. To this end, scene images from different sources, such as web search results and user query examples, are incrementally uploaded to extend the server's scene dataset. More particularly, described is a scalable vision-based location recognition system in which the backend database is updated incrementally. Further described is a trigger mechanism that determines when the incremental updating is to occur.

While some of the examples described herein are directed towards a particular vocabulary tree structure, it is understood that these are only examples. Other structures and scene recognition models may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and scene recognition in general.

Figure 1:
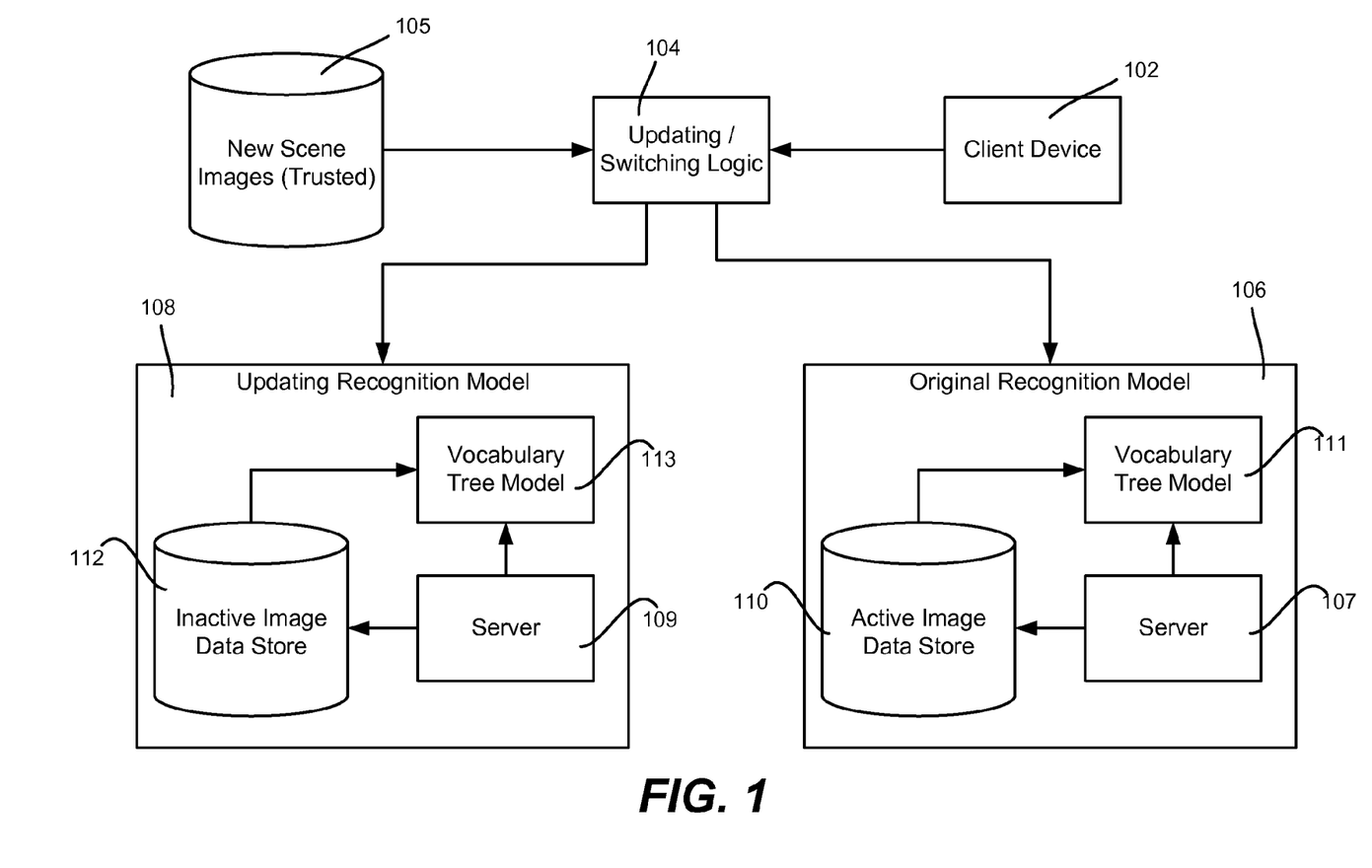
FIG. 1 is a block diagram showing an example scene recognition system configured for incremental indexing at adaptively triggered times.

Turning to FIG. 1, there is shown a general scene recognition model configured for incremental updating as described herein. In general, a client device 102 sends in queries in the form of images to match to results. Logic 104, which as exemplified herein handles updating and switching decisions, decides whether the client device query is to be sent to an original recognition model 106, or to an updated/updating recognition model 108 based upon the state of the incremental update with respect to new scene images 105, e.g., whether it is finished or updating (or still awaiting an update trigger as described below). Note that once switched, the updating recognition model becomes the next original recognition model, but for purposes of the description herein the models are named so as to indicate which is the one that is most-recently updated or being updated.

Further note that while each model 106, 108 includes a server 107 or 109 respectively, the server may be the same physical machine that is switched to use the appropriate data store (110 or 112) and vocabulary tree model (111 or 113) according to the incremental updating state. However, in one implementation, to provide consistent service while performing incremental indexing, there are two separate central computers at the server-end, e.g., server 107 and 109 as represented in FIG. 1. Each maintains its respective location recognition model 106 or 108 that operate identically once updated. Initially, the status of one model 106 is set as active while the other model 108 is inactive, where active generally means that the model provide the service to the client, while inactive means that the server (its program) is being utilized for incremental indexing.

In general, the system collects incremental scene images as well as their GPS locations from scene images uploaded by system administrators, which are carefully selected and treated as fully trusted, from query images sent by users to the server-end computer, which are considered as under evaluated, and images periodically crawled from a remote third-party source (also considered under evaluated); the scene name and the city name may be used as crawling criteria.

For under evaluated scene images, pre-processing is conducted to further filter for irrelevance. More particularly, considering each new image as a query, the scene recognition process is simulated in a server, in which the cosine distance between this query and the best matched image is compared with a maximum diversity threshold Tmax. If the distance is larger than Tmax, the image is discarded, otherwise it is added to the fully trusted image set (data store 105), which is treated as the new data batch to update the database.

Figure 2:
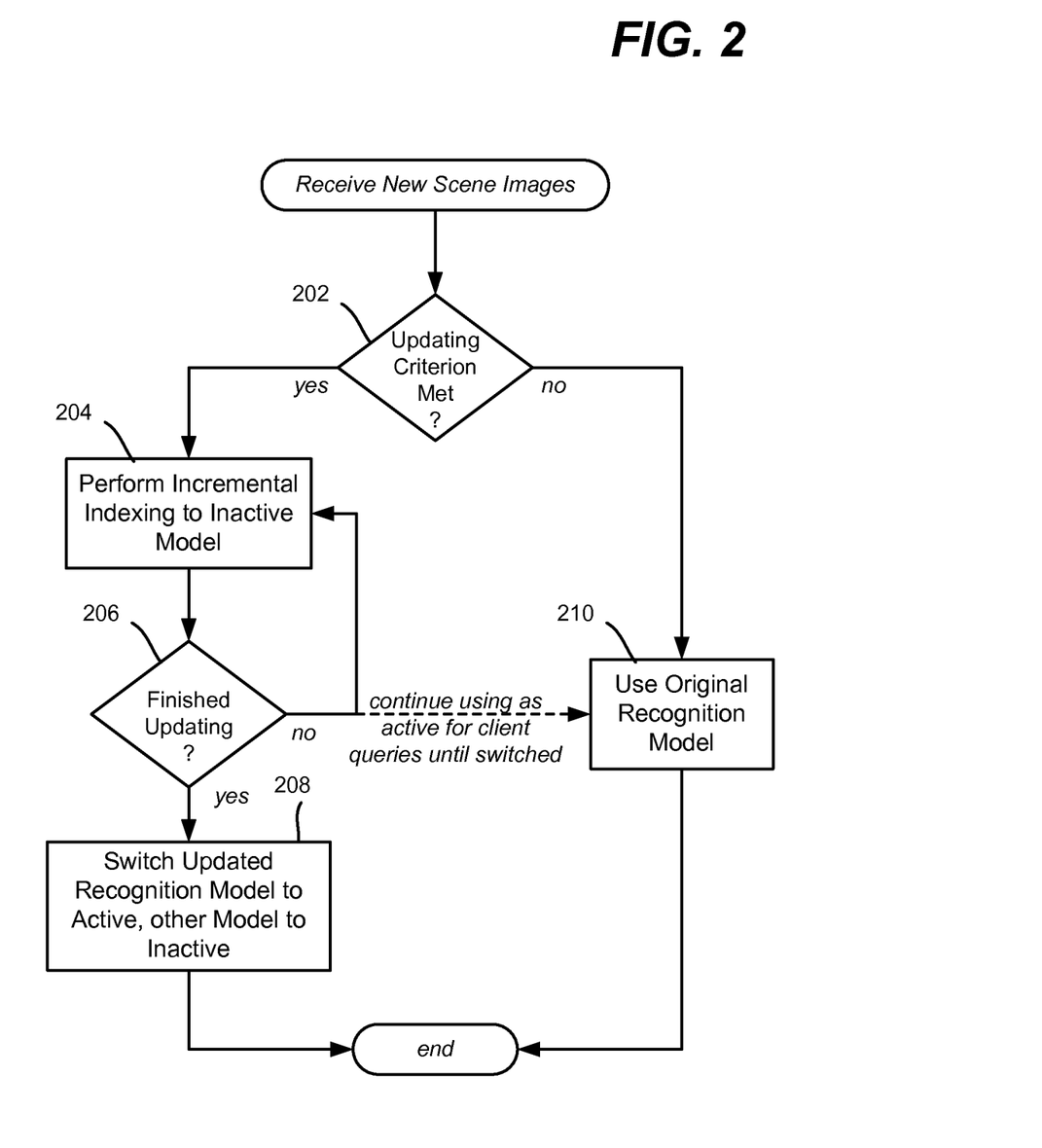
FIG. 2 is a flow diagram representing example steps for performing incremental indexing in a scene recognition system.

As generally represented in FIG. 2, when the inactive model receives a new batch of scene images, criteria are evaluated (step 202) to determine whether to activate the incremental indexing process. If so, incremental indexing is performed at step 204, and when finished (step 206), the model is switched (step 208) from inactive status to active, (and vice-versa for the other model). If not ready for switching, the images are stored and added via subsequent new image batches. Step 210 indicates that the original recognition model remains active when the updating criteria is not met, and until updating is finished.

Thus, via the logic and a trigger mechanism, there is provided a unified solution to adapt a vision-based location recognition system to handle dataset changes. More particularly, the recognition model is incrementally updated by an adaption implementation algorithm, but is only updated when triggered by an adaption trigger criteria. To summarize via FIG. 1, the exemplified framework enables incremental update of the backend database comprising adding images 105 to the data store 112 and indexing of a vocabulary tree model 113, which efficiently includes new data into the recognition model 108 without needing to regenerate the entire model from the overall dataset. To reduce computational costs, an adaption trigger criteria is used to determine when the incremental updating occurs according to density-based relative entropy estimation between the original dataset and newly arriving data. Instead of overall model re-training only the vocabulary tree is used to generate the BoW vectors for new images, without updating or re-training the VT-based recognition model.

Note that when the distribution of new image patch is sufficiently different with respect to the original dataset, the performance decreases as new image batches arrive. This is handled by having the model be scalable to data variation, wherein "scalable" generally indicates that the recognition model is adaptive to data addition and removal in an incremental dataset.

To achieve scalability in vision-based location recognition, a vocabulary tree incremental indexing algorithm is presented to match a vocabulary tree-based recognition model to frequent distribution of new data. In general, the SIFT (Scale Invariant Feature Transform) features of a new data batch are re-indexed using the original tree, based on which new TF-IDF (term frequency-inverse document frequency) term weightings for each word is calculated. The frequency of each word corresponds to its relevance and its possible need for further expansion. Further, words in the vocabulary tree that contain overabundant or over-limited features are adapted to fit the new data.

In one implementation, three operations are defined to iteratively refine the model structure to fit the new data distribution, as generally represented in Table 1. One operation is a Leaf Split, wherein if the number of features contained in a leaf node is higher than a maximum threshold Lmax, the features of this node are clustered to m leaves in its sub-level (m is the same branching factor as in vocabulary tree construction). Another operation is Leaf Delete, wherein if the feature frequency of a newly generated leaf is lower than a pre-defined minimum threshold Lmin, its features are reassigned to the nearest leaves within the sibling nodes of this deleted leaf. Another operation is Parent Withdraw: if the feature frequency of a newly-generated leaf is lower than minimum threshold, and this leaf is the only child of its parent, this leaf is withdrawn and its parent degraded as a new leaf.

TABLE 1

Vocabulary tree incremental indexing

Input: SIFT feature set of new data batches.
For each feature in new data batches{
   Re-index this feature vector over the VT hierarchy
   Increase the feature frequency of the nodes in VT hierarchy that this
   feature goes through in indexing}
Go through all leaf nodes of VT{
   If its feature frequency is lower than $L_{min}$ or higher than $L_{max}$,
   push this node into the Operation Array.}
While the Operation Array is not empty{
   Get the first element
   If its feature frequency is higher than $L_{max}${
     Leaf Split, push new leaves into Operation Array}
   If its feature frequency is lower than $L_{min}${
     If there are siblings of this node{
       Leaf Delete, push renewed leaves into Operation Array}
     Else{
       Parent Withdraw}}}
   Delete this first element}
Output: Refined vocabulary tree after adaption.

With respect to the updating criteria based on relative entropy estimation, when a new batch of images is available, it is not always necessary to activate the incremental indexing process in the inactive model. In general, the vocabulary tree can be regarded as a data driven model; if the distribution of new data is almost identical to that of original dataset, the updating may be postponed awaiting additional new images.

In one implementation, triggering occurs based on one of two (or both) criteria being met, namely when the volume of new images is sufficiently large, and/or when the distribution of new images is extremely diverse from that of original dataset.

One adaption trigger criteria uses Kullback-Leibler diversity based relative entropy estimation. In a first step, data distribution is measured by its sample density, which is further discretely approximated by point density. Initially, a Density Field of current dataset in SIFT space is estimated and approximated by the density of each SIFT point, in which the density of a SIFT point in 128-dimensional SIFT space is defined as:

$$D(i) = \frac{1}{n}\sum_{j=1}^{n} e^{-\|x_i-x_j\|_{L2}} \quad (1)$$

where D(i) is the point-density of ith SIFT point; n is the total number of SIFT points in this dataset; $x_j$ is $j^{th}$ SIFT point. L2 distance evaluates the distance between two SIFT points. To reduce computational cost, the density of each SIFT point by its local neighbors are estimated as an approximation:

$$\tilde{D}(i,m) = \frac{1}{m}\sum_{k=1}^{m} e^{-\|x_i-x_j\|_{L2}} \quad (2)$$

where $\tilde{D}(x,m)$ is the point-density of $i^{th}$ SIFT feature in its m neighborhood. By neighborhood approximation, point based density is estimated. Their m nearest neighbors are stored for Density Field updating of new data batch. The data dissimilarity between the original dataset and the new data batch is evaluated by their density-based KL-like relative entropy estimation as:

$$Diver_{Accumulate} = \sum_{i=1}^{n}\left(\tilde{D}_{new}(i,m)\log\frac{\tilde{D}_{new}(i,m)}{\tilde{D}_{org}(\text{Nearest}(i),m)}\right) \quad (3)$$

in which $\tilde{D}_{new}(i,m)$ is the density of new data at $i^{th}$ data point in $m^{th}$ neighborhood; $\tilde{D}_{org}(\text{Nearest}(i),m)$ is the density of old data at the nearest old point of $i^{th}$ new data in $m^{th}$ neighborhood. It can be observed from the above equation that data diversity increases as the volume of new data batch increases, and/or as the distribution of original dataset and new data batch become more diverse.

Based on data diversity evaluation, the incremental indexing process is controlled by the triggering criteria as follows:

TABLE 2

Trigger criteria test:

Input: SIFT feature set of new data batches.
For each point i in the new dataset{
  Estimate the density of i by m neighborhood approximation
  Search the nearest original point Nearest(i)
  Calculate $i^{th}$ part of Eq.3, add to Diver$_{Accumulate}$}
  If Diver$_{Accumulate} \geq \mu_{max}$ (the maximum tolerant diversity{
    Carry out Vocabulary Tree Incremental Indexing
    Go to Output }
  Else
  { Add current data to next batch images }
Output: Updated Vocabulary Tree When merging the new data batch into original dataset, the density in the original dataset need not be updated. Indeed, their former density estimations can be partially preserved, and only need to be modified by the new data as:

$$\tilde{D}_{Update}(i,m) = \tilde{D}_{org}(i,k) + \tilde{D}_{New}(i,m-k) \quad (4)$$

where k is the number of remaining original points in m nearest neighbors, which is achieved by comparing the new data with the former-stored m nearest neighbors of each point.

Exemplary Operating Environment

Figure 3:
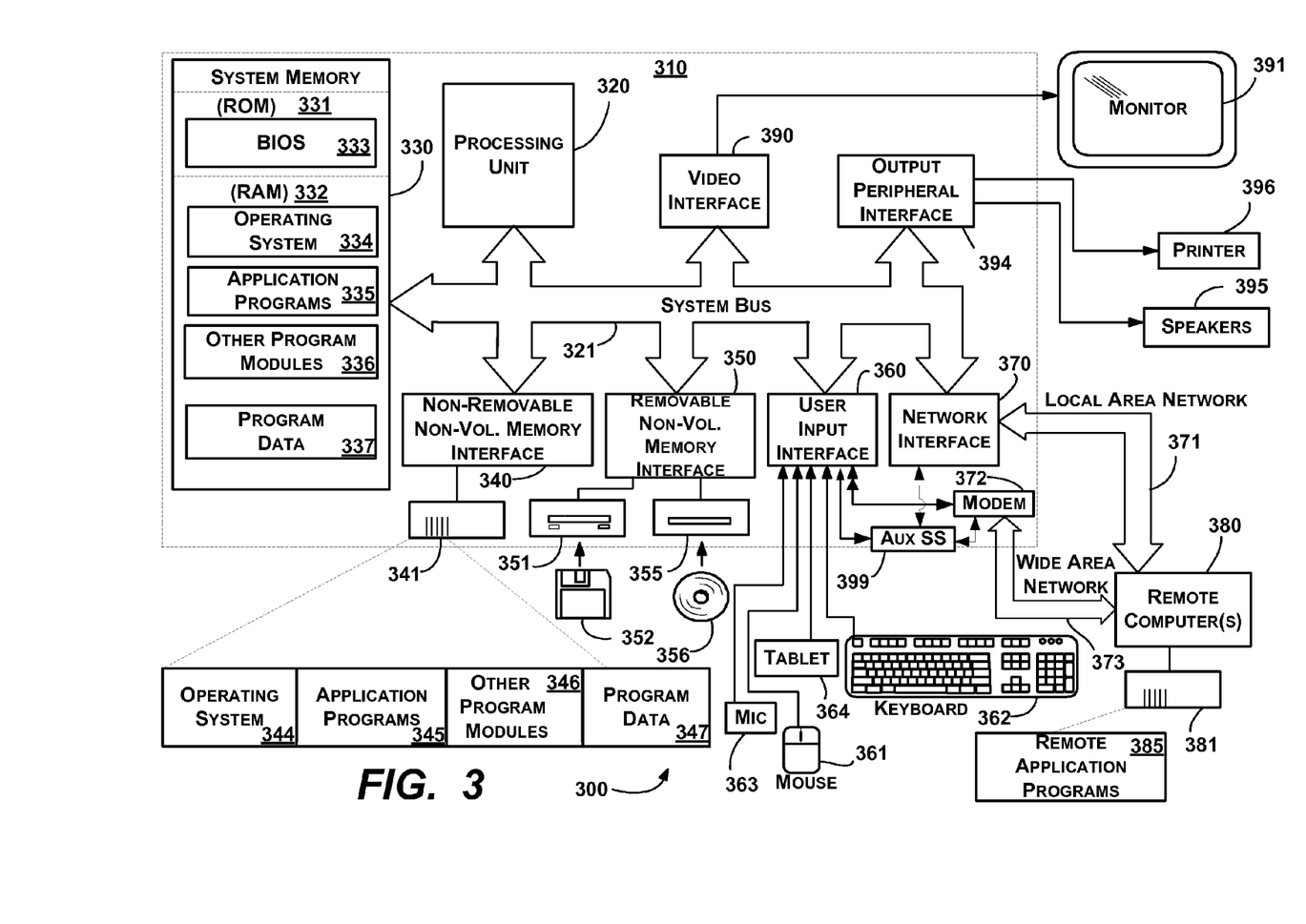
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:
1. In a computing environment, a method comprising:
receiving new images at an image retrieval system, and incrementally updating a vocabulary tree model structure,
having a parent node with one or more child leaf nodes,
based upon the new images using a computer processor,
including iteratively refining the model structure to fit a new data distribution based on the new images, wherein iteratively refining comprises:
  updating a given one of the child leaf nodes based upon words corresponding to the new images;
  evaluating feature frequencies of the given updated child leaf node against a threshold value; and
  processing the updated child leaf node based on the evaluation, wherein processing comprises determining that the updated child leaf node has a feature frequency that is below the threshold value and that the updated child leaf node has at least one sibling leaf node and, in response to the determination, deleting the updated child leaf node and assigning features of the updated child leaf node to one or more of the at least one sibling leaf node.

2. The method of claim 1 wherein the threshold value comprises a lower threshold value and the method comprises:
  updating a second child leaf node based upon words corresponding to the new images;
  evaluating feature frequencies of the second updated child leaf node against an upper threshold value;
  determining that the second updated child leaf node has a feature frequency that exceeds the upper threshold value; and
  in response to the determination, splitting the second updated child leaf node by clustering features of the second updated child leaf node to leaves in its sub-level.

3. The method of claim 1 further comprising:
  updating a second child leaf node based upon words corresponding to the new images;
  evaluating feature frequencies of the second updated child leaf node against the threshold value;
  determining that the second updated child leaf node has a feature frequency that is below the threshold value and that the second updated child leaf node does not have any sibling leaf nodes; and
  in response to the determination, withdrawing the second updated child leaf node to its parent node such that its parent node is degraded to a leaf node.

4. The method of claim 1 further comprising, triggering the incremental updating based on evaluating whether triggering criteria being met.

5. The method of claim 4 wherein evaluating whether the triggering criteria is met comprises evaluating an amount of the new images.

6. The method of claim 4 wherein evaluating whether the triggering criteria is met comprises evaluating how diverse the new image data is to a current set of original image data.

7. The method of claim 1 further comprising, determining that incremental updating is complete, switching a server that performed the incremental updating to an active state with respect to handling client queries for image retrieval, and switching another server was handling client queries for image retrieval to an inactive state.

8. In a computing environment, a system comprising:
  a first server operating in an active state with respect to handling client queries for image retrieval,
  a second server operating in an inactive state with respect to handling client queries for image retrieval, and
  logic coupled to the first server and the second server, the logic being configured to:
    determine when to incrementally update the second server using new image data based upon diversity of the distribution of new image data relative to image data being used by the first server; and
    upon completion of the incremental update to the second server, switch the first server to the inactive state with respect to handling client queries for image retrieval and switch the second server to the active state with respect to handling client queries for image retrieval.

9. The system of claim 8 wherein the logic is further configured to determine when to incrementally update the second server based upon an amount of new image data.

10. The system of claim 8 wherein the logic determines that the second server is to be incrementally updated, and wherein the second server performs the incremental update by updating leaf nodes of a vocabulary tree data structure based on the new image data, processing the leaf nodes to evaluate each leaf node's feature frequency against at least one threshold value, splitting a leaf node when the feature frequency exceeds an upper threshold value, deleting a leaf node when the feature frequency is below a lower threshold value and the leaf node has at least one sibling leaf node, and withdrawing a leaf node when the feature frequency is below the lower threshold value and the leaf node has no sibling leaf node or nodes.

11. One or more hardware computer-readable storage media having computer-executable instructions, which when executed by a computer, configure the computer to:
  collect new image data at an image retrieval system,
  determine that the new image data collected at the image retrieval system meets a triggering criterion based on at least one of:
    a volume of the new image data collected at the image retrieval system; and
    diversity of the new image data relative to another set of image data; and
  in response to determining that the new image data meets the triggering criterion, incrementally update a vocabulary tree model structure, that has one or more parent nodes each having one or more child leaf nodes, based upon the new image data by:
    updating a given one of the child leaf nodes based upon the new images;
    determining that a number of features of the given updated child leaf node is below a lower threshold value;
    determining whether the given updated child leaf node has any sibling leaf nodes;
      if the given updated child leaf node has at least one sibling leaf node, deleting the given updated child leaf node and assigning the features of the given updated child leaf node to one or more of the at least one sibling leaf node; and
      if the given updated child leaf node does not have any sibling leaf nodes, withdrawing the given updated child leaf node to its parent node such that the parent node is degraded to a leaf node.

12. The one or more hardware computer-readable storage media of claim 11 wherein the instructions configure the computer to determine that the new image data meets at least one triggering criterion by evaluating an amount of the new image data.

13. The one or more hardware computer-readable storage media of claim 11 wherein the instructions configure the computer to determine that the new image data meets at least one triggering criterion by evaluating how diverse the new image data is to another set of image data.

14. The one or more hardware computer-readable storage media of claim 11 wherein the instructions configure the computer to determine that the new image data meets at least one triggering criterion by computing an entropy estimation.

15. The one or more hardware computer-readable storage media of claim 11, wherein the instructions configure the computer to:
- switch a server that performed the incremental updating to an active state with respect to handling client queries for image retrieval, when the triggering criteria is met and incremental updating is performed.

16. The one or more hardware computer-readable storage media of claim 11, wherein the instructions configure the computer to:
- evaluate the given updated child leaf node's feature frequency against an upper threshold value, and
- if the feature frequency exceeds the upper threshold value, split the given updated child leaf node by clustering features of the given updated child leaf node to leaves in its sub-level.

* * * * *